US008408428B2

(12) United States Patent
Donnette et al.

(10) Patent No.: US 8,408,428 B2
(45) Date of Patent: Apr. 2, 2013

(54) DEVICE FOR DELIVERING A COMPOSITION, THE DEVICE INCLUDING A MEMBRANE FORMING A CHECK VALVE

(75) Inventors: Xavier Donnette, Soleymieu (FR); Jose Camba, Ambrieu en Bugey (FR); Gaetan Painchaud, Francheville (FR); Sylvain Lanzi, Chirens (FR)

(73) Assignee: Rexam Healthcare La Verpilliere (FR)

( * ) Notice: Subject to any disclaimer, the term of this patent is extended or adjusted under 35 U.S.C. 154(b) by 458 days.

(21) Appl. No.: 12/701,299

(22) Filed: Feb. 5, 2010

(65) Prior Publication Data

US 2010/0213216 A1 Aug. 26, 2010

(30) Foreign Application Priority Data

Feb. 6, 2009 (FR) ..................................... 09 50776

(51) Int. Cl.
*B65D 83/76* (2006.01)
*G01F 11/00* (2006.01)
*B05B 11/00* (2006.01)

(52) U.S. Cl. .................. 222/381; 222/321.7; 222/383.1; 222/321.9

(58) Field of Classification Search ............... 222/321.9, 222/321.7, 321.1, 385, 336, 339, 340, 380, 222/381, 383.1, 383.3
See application file for complete search history.

(56) References Cited

U.S. PATENT DOCUMENTS

| | | | | |
|---|---|---|---|---|
| 5,617,976 | A * | 4/1997 | Gueret | 222/380 |
| 7,780,044 | B2 * | 8/2010 | Leuliet et al. | 222/321.9 |
| 7,866,513 | B2 * | 1/2011 | Leuliet et al. | 222/381 |
| 7,882,988 | B2 * | 2/2011 | Nicolle et al. | 222/321.9 |
| 2008/0116227 | A1 | 5/2008 | Leuliet et al. | |

FOREIGN PATENT DOCUMENTS

| | | | |
|---|---|---|---|
| FR | 2048416 | A5 | 3/1971 |
| FR | 2885890 | A1 | 11/2006 |
| GB | 2176543 | A | 12/1986 |

OTHER PUBLICATIONS

Republic of France Preliminary Search Report and Written Opinion; FR 0950776; Sep. 17, 2009; 6 pages.

* cited by examiner

*Primary Examiner* — Kevin P Shaver
*Assistant Examiner* — Stephanie E Williams
(74) *Attorney, Agent, or Firm* — St. Onge Steward Johnston & Reens LLC

(57) ABSTRACT

The device includes a membrane slidably mounted in a metering chamber, the membrane including a first sealing element forming a check valve, and a second sealing element enabling the membrane to slide in a leaktight manner relative to the metering chamber. The first and second sealing elements are made of a material that is relatively flexible, the membrane also including a rigid portion made of a material that is more rigid than the material of the first and second sealing elements.

16 Claims, 3 Drawing Sheets

DEVICE FOR DELIVERING A COMPOSITION, THE DEVICE INCLUDING A MEMBRANE FORMING A CHECK VALVE

CROSS-REFERENCE TO RELATED APPLICATIONS

The present application claims priority of French patent application No. 0950776 filed on Feb. 6, 2009, the content of which is incorporated herein by reference.

FIELD OF THE INVENTION

The present invention relates to the technical field of delivering a liquid, semiliquid, viscous, or gaseous composition, in particular in the medical field. The device may include a pump or any other dispenser means that includes a check valve. The device may be used in particular for producing a nasal spray, for dispensing an ophthalmic liquid, or indeed for inhaling powder.

BACKGROUND OF THE INVENTION

By way of example, in the pump described in document FR 2 885 890, use is made of a resilient membrane constituting a check valve, the membrane being fitted on a support that is pieced by a feed channel and that acts as a seat configured in such a manner that the check valve is either pressed against the seat in order to block the liquid, or else is spaced apart from the seat in order to allow the liquid to pass. The membrane is mounted to slide in leaktight manner in a metering chamber of the pump in order to expel from the chamber the composition that has been stored temporarily in the chamber. For this purpose, the resilient membrane has a transverse wall forming a check valve that closes a feed orifice of the chamber, and a cylindrical skirt provided with one or two peripheral sealing lips in sliding contact with the inside wall of the metering chamber.

It is found that that resilient membrane can be difficult to make and assemble. It is important for the checkvalve-forming portion to be capable of taking up optimally both a composition-release configuration and a composition-blocking configuration. In other words, it is important for this check-valve-forming portion to be in leaktight contact with a support in order to prevent the composition from passing in one direction so long as the membrane is not subjected to suction, and that as soon as it is subjected to a level of suction that is as small as possible, it is important for it to allow the composition to pass. Thus, the checkvalve-forming portion needs to present dimensions and a position that are as accurate as possible.

SUMMARY OF THE INVENTION

The present invention seeks in particular to provide a membrane that is easy to make and that is reliable in providing a leakproof check valve.

To this end, the invention provides a device for delivering a composition, the device comprising a membrane slidably mounted in a metering chamber, the membrane comprising:

first sealing means forming a check valve; and second sealing means enabling the membrane to slide in leaktight manner relative to the metering chamber, the first and second sealing means being made of a material that is relatively flexible, the membrane also including a rigid portion made of a material that is more rigid than the material of the first and second sealing means. More precisely, the device includes a piston comprising a support and a membrane, the support including a feed channel opening out via one or more feed orifices provided in the top end of the support. In addition, the checkvalve-forming first sealing means may take up a liquid-blocking configuration by being pressed against the support.

Because of the rigid portion, the membrane presents a position that is easier to determine than would be possible if the membrane were made entirely out of a flexible or soft material. Once the membrane has been assembled with the other parts of the device, and because of its more rigid portion, its dimensions associated with assembly with the other part give rise to tolerances that are tighter. Thus, the membrane is capable of performing in satisfactory manner its functions of ensuring that the checkvalve-forming portion and the portion providing sealing with the metering chamber are leaktight, because of the flexibility of the material of the first and second sealing means, while also presenting dimensions and positioning that are accurate. In other words, the structure of the membrane is optimized by giving flexibility to its zones that provide sealing, and rigidity to its zones that do not provide sealing directly, thereby making it easier to control the dimensions and the position of the membrane during assembly. It should be observed that it is particularly important for a membrane that performs a check valve function to have dimensions and a position that are accurate. In order to perform the check valve function, the membrane may be deformed against one or more feed orifices provided in the support so as to be pressed against the support, and it is the force exerted by the membrane attempting to return to its non-deformed position that ensures that the valve is leaktight. If the membrane is poorly positioned, or if it is of dimensions that are not very accurate, then the force exerted by the membrane on the feed orifice is either not sufficient or else too great, or at least is poorly controlled in terms of industrial fabrication, since that leads to a wide variety of membrane opening pressure and suction levels. Thus, the rigid portion provides better control over the dimensions and the position of the membrane relative to the support, and thus over the force required for leaktight closure of the check valve, and also over the force exerted by the second sealing means against the wall of the metering chamber in order to slide in leaktight manner, thereby expelling the composition contained in the metering chamber.

It should be observed that the first sealing means form a check valve by being capable of taking up a liquid-blocking configuration in co-operation with the support, and a composition-release configuration, the composition-blocking configuration preventing the composition from returning into the feed channel once the composition has been released. It should be understood that in the liquid-blocking configuration, the first sealing means are pressed against the support, and more precisely against the top end of the support that forms a seat against which they are pressed by resilient return, and that in the composition-release configuration, the first sealing means separate from the seat by elastic deformation under the effect of the composition being under pressure, thereby creating a space through which the composition passes. It should also be observed that the membrane is slidably mounted in the metering chamber between a rest position, also referred to as a low position, and an activated position, also referred to as a high position. The metering chamber thus defines a metering volume corresponding to the difference between a high position chamber volume and a low position chamber volume, which low position volume is also referred to as a "dead" volume. For example, the low position or "dead" volume may be substantially zero, and the high position volume may correspond substantially to the volume of a delivered dose. Since the dead volume is not necessarily zero, the volume of the metering chamber may be greater than the volume of a dose. Furthermore, the membrane may naturally include sealing means other than the above-defined first and second sealing means. In particular, the membrane may have third sealing means providing sealing between the membrane and the membrane support. It should also be observed that the assembly comprising the rigid portion and the first and second, and possibly also third sealing means, is constrained to move as a whole in sliding within the metering chamber.

The device may also include one or more of the following characteristics.

The rigid portion, and the first and second sealing means are obtained by co-injection, bi-injection, or overmolding. Other methods for assembling together the two or three different materials could nevertheless be used.

The rigid portion is made of a material selected from a polymer, e.g. polypropylene, polyethylene, polyester (such as poly-butylene-terephthalate (PBT)), polyacetal, polyamide, or of a metal, e.g. stainless steel. Furthermore, the first or second sealing means may be made of silicone, of some other elastomer material, or of a polymer, e.g. polyethylene or polypropylene. It should be observed that whatever the materials used for these various elements, the material of the rigid portion is more rigid than the material of the first and second sealing means.

The rigid portion is substantially in the form of a ring. Thus, the rigid portion forms a cylindrical segment of relatively rigid structure so as to provide control over the dimensions and the stresses exerted on the membrane.

The second sealing means include at least one lip forming a body of revolution, and preferably two lips. Amongst the many forms that are possible, the section of the lip may be toroidal, constituting substantially a half-disk. Its section may also be angular.

The membrane includes a transverse wall carrying the first sealing means, and a cylindrical skirt carrying the second sealing means, the rigid portion extending mainly in the cylindrical skirt.

The membrane is assembled on the support and includes a base bearing against the support, the bearing base forming a portion of the rigid portion of the membrane. Thus, since the bearing base is made of a rigid material, it is guaranteed that the abutment position of the membrane on the support is not obtained by a flexible portion of the membrane being flattened against the support, and thus that the assembly dimensions of the membrane on the support are better controlled. Thus, because of the bearing base, an assembly is provided in which the positions of the membrane and of the support are determined by two rigid surfaces and not via one rigid surface and one flexible surface, i.e. a more deformable surface. It should be observed that when the membrane is assembled on the support, it is preferable to make provision for there to be third sealing means that provide sealing between the membrane and the membrane support.

The rigid portion includes a bearing surface for a tool for assembling the membrane in the device. Thus, because of this rigid surface against which a thrust force can be exerted, assembly is facilitated.

The device comprises third sealing means providing permanent sealing between the support and the membrane support.

The membrane is used in a pump. More precisely, together with the support, the membrane forms a piston that is mounted to slide in a cylinder of the pump so as to define the metering chamber. The metering chamber is fed with composition via the check valve, which valve enables the liquid contained in the reservoir of the device to pass through.

The membrane is fitted on the support, and the support includes a bearing seat for the first sealing means, which first sealing means are pressed against the seat when they are in a blocking configuration, and are spaced apart therefrom when they are in a composition-release configuration. Thus, the rigid portion of the membrane enables the membrane to have dimensions and a position that are more reliable relative to the support, and thus enables the check valve function to be more leaktight.

The support includes a tubular portion defining the feed channel and the membrane includes a cylindrical skirt mounted stationary around said tubular portion.

The seat is integrally molded with the support.

BRIEF DESCRIPTION OF THE DRAWINGS

The invention can be better understood on reading the following description given purely by way of example and made with reference to the drawings, in which.

DETAILED DESCRIPTION OF THE INVENTION

Figure 1:
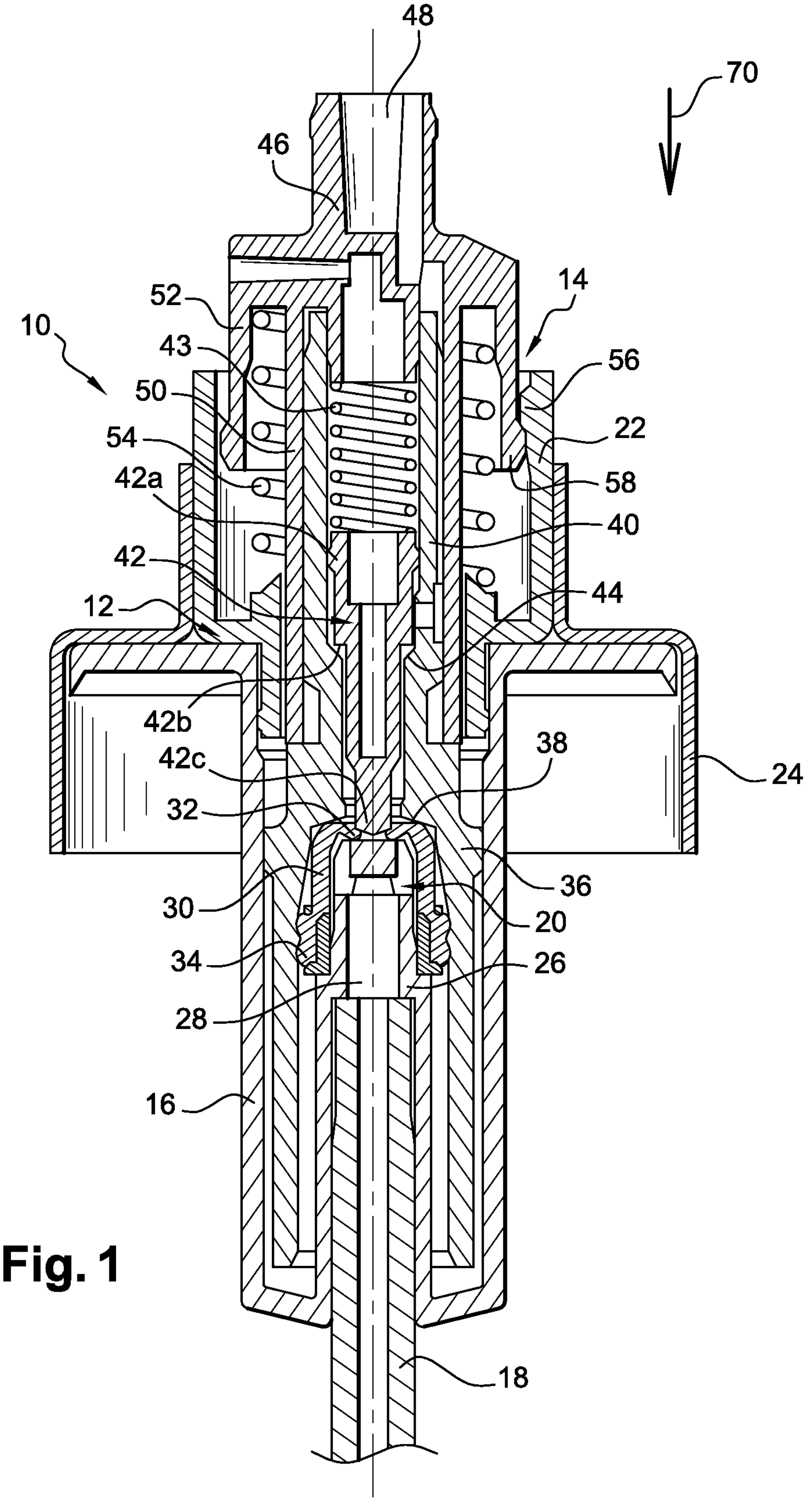
FIG. 1 is a section view of an embodiment of a device for delivering a composition, the device being in the activated position.

As can be seen in FIG. 1, a device for delivering a liquid, semiliquid, viscous, or gaseous composition comprises a pump 10, e.g. used to deliver a nasal spray of a pharmaceutical. The pump 10 is designed to be mounted on a reservoir (not shown) and it is generally surmounted by a dispenser endpiece (not shown) on which the user presses.

Figure 2:
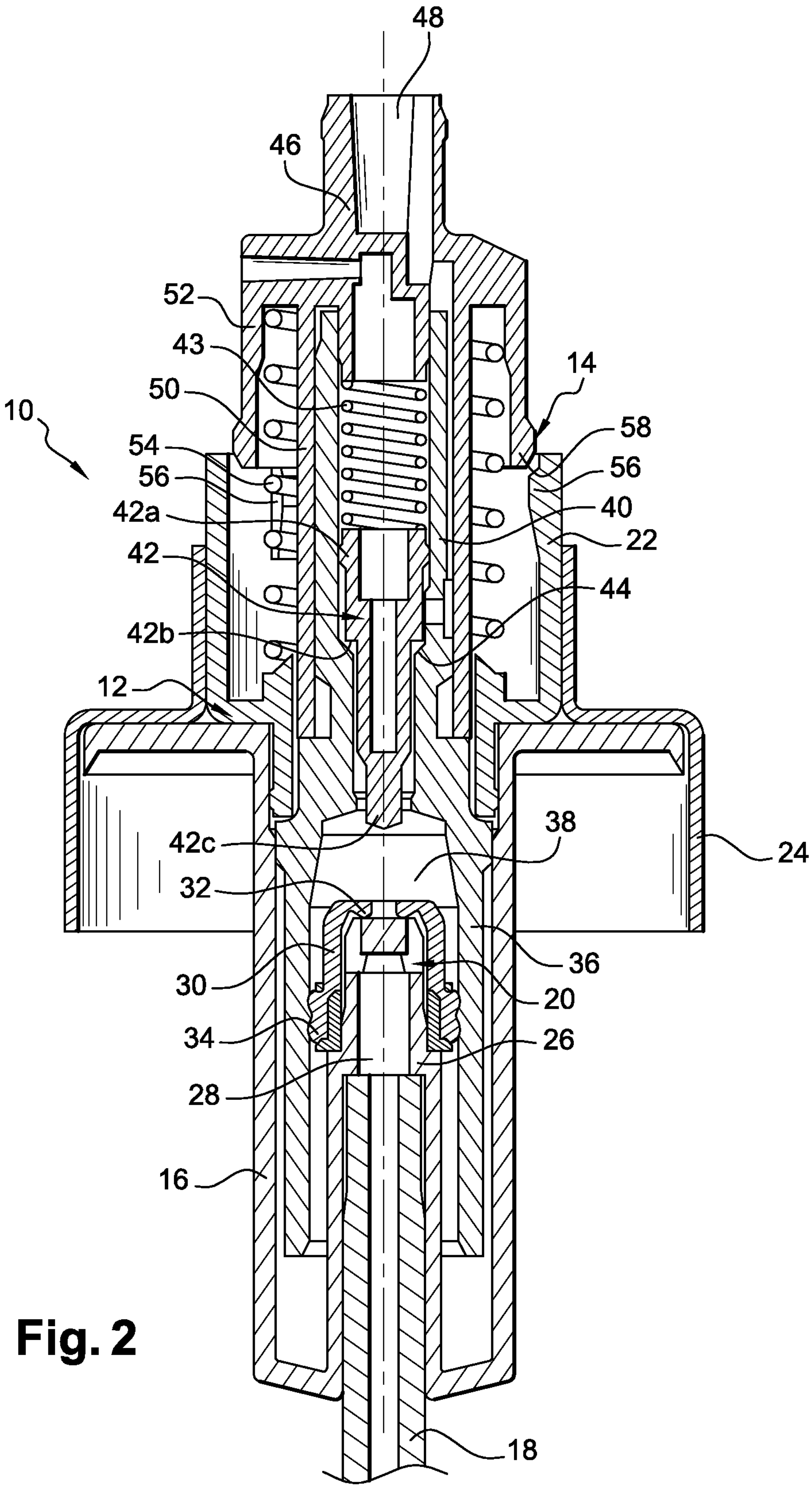
FIG. 2 is similar to FIG. 1, the device being in the rest position.

The pump 10 comprises a first portion 12, referred to as a stationary portion, and a second portion 14 referred to as a movable portion or a dispenser head, that is movable relative to the stationary portion 12 between a rest position, shown in FIG. 2, and an activated position, shown in FIG. 1. In this example, the rest position corresponds to a position that is said to be “high” and the activated position corresponds to a position that is said to be “low”.

In this example, the stationary portion 12 comprises a pump body 16 carrying a dip tube 18, a piston 20, and a guide sleeve 22. The dip tube 18 is connected to the reservoir in order to draw therefrom the composition for passing into the pump. Furthermore, the stationary portion 12 includes a fastener collar 24 enabling the pump 10 to be crimped onto the reservoir. It should be understood that the pump could equally well be mounted on the reservoir by screw-fastening or by snap-fastening.

The piston 20 comprises a support 26 mounted stationary in the bottom portion of the pump body 16 with a feed channel 28 arranged in line with the dip tube 18 passing therethrough and opening out via one or more feed orifices provided in the top end 32 of the support. The top end 32 forms a bearing seat for first sealing means, as described below. In this example, the support 26 is generally tubular in shape, presenting at its proximal end a tubular housing for receiving the dip tube 18, and at its distal end a tubular portion defining the channel 28 and extended by a bearing seat 32 for sealing means that extend the channel 28. It should also be observed that the support 26 is connected to the pump body 16 by a transverse wall. In this example, the support 26 is integrally molded with the transverse wall and the pump body 16. The support 26 also carries a membrane 30 on its top end 32, which membrane is mounted stationary on the support 26 around the tubular portion defining the channel 28.

Figure 3:
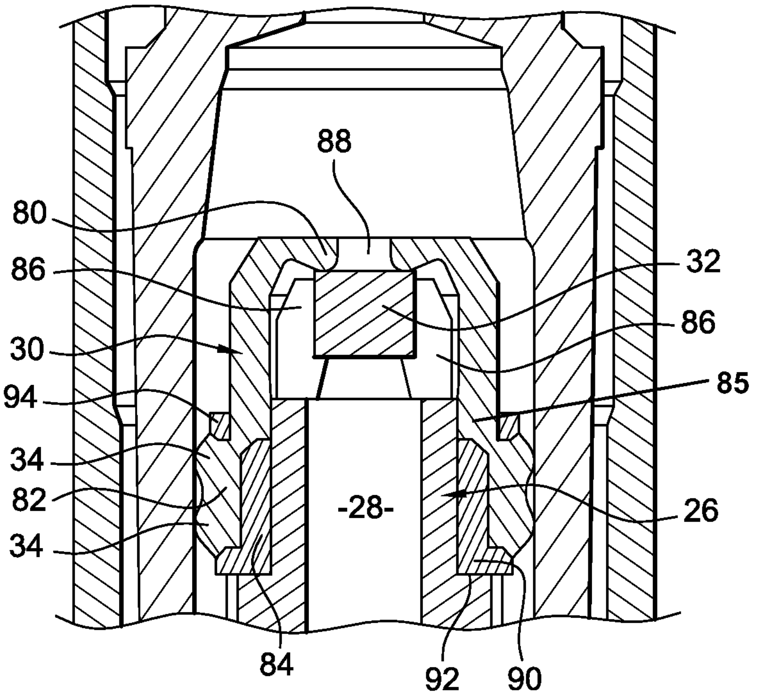
FIG. 3 is an enlarged view of a portion of the FIG. 2 device.

The membrane 30 has first sealing means 80, second sealing means 82, and a rigid portion 84. The elements 80, 82, and 84 may be obtained by co-injection, bi-injection, or overmolding. The first and second sealing means 80 and 82 are made of a flexible material, e.g. a silicone or some other elastomer material or a polymer (e.g. polyethylene, polypropylene, etc.). The rigid portion 84 is made of a material that is more rigid than the material of the means 80, 82, e.g. a polymer (e.g. polypropylene, polyethylene, polyester (such as poly-butylene-terephthalate (PBT)), polyacetal, polyamide, etc.) or metal (e.g. stainless steel, etc.). In this example, the membrane 30 is provided with a top transverse wall carrying the first means 80, and with a cylindrical skirt carrying the second means 82. As can be seen in FIG. 3, the membrane defines an inside cavity that is engaged on the top end 32 of the support 26. Furthermore, the membrane 30 includes third sealing means 85 providing permanent sealing between the membrane 30 and the support 26. These third sealing means 85 are likewise made of a material that is more flexible than the material of the rigid portion 84. More precisely, these third sealing means 85 are placed inside the cylindrical skirt of the membrane 30, between the first and second sealing means 80 and 82. The third sealing means 85 prevent liquid passing through this zone between the support 26 and the membrane 30, so that the composition contained in the inside cavity of the membrane, coming from the channel 28, can escape only via the check valve. It should be observed that in this example, the membrane 30 is engaged on the support 26, however these elements could be assembled together in some other way.

The first sealing means 80 constitute a check valve. They may take up a liquid-blocking configuration, being pressed against the support 26, and a composition-release configuration in which they deform elastically to allow the liquid coming from the channel 28 to pass through. In the blocking configuration, the means 80 close one or more feed orifices 86 formed in the support 26, preventing the composition from returning into the channel 28 once it has been released. In this example, the first sealing means are in the form of one (or more) beads 80 formed on the inside periphery of one (or more) orifices 88 for releasing the liquid, the orifice 88 in this example being arranged at the center of the top surface of the membrane. When in the blocking configuration, the means 80 are pressed against the support 26 by resilient return. More precisely, the top end 32 of the support 26 constitutes a bearing seat for the means 80. In this example, the seat 32 is in the form of a projecting element 32 of substantially cylindrical shape carried by tabs that extend the channel 28 and that define the orifices 86, so that the liquid coming from the channel 28 can pass between the tabs, going round the seat 32 so as to be blocked by the bead 80 when pressed against the top wall of the seat 32. Preferably, the seat 32 is integrally molded with the support 26. When in the composition-release configuration, the means 80 deform so as to lift off the top surface of the seat 32 and thus create a space that allows the composition to pass into a metering chamber 38.

Figure 4:
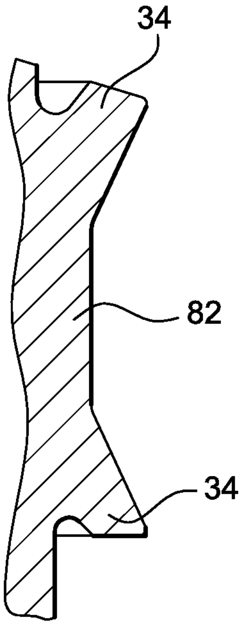
FIG. 4 is an enlarged view of second sealing means of the membrane shown in FIG. 1, in a variant embodiment.

The movable portion 14 of the pump comprises not only the dispenser endpiece, but also a first cylinder 36 slidably mounted inside the pump body 16 and co-operating with the piston 20 and more precisely with the membrane 30 to define the metering chamber 38. In other words, the membrane 30 is slidably mounted in the first cylinder 36 and thus in the chamber 38. For this purpose, the second sealing means 82 present one or more sealing lips 34 that provide leaktight sliding for the membrane 30 relative to the metering chamber 38 for the purpose of expelling the composition contained in the chamber 38. Thus, the chamber 38 defines a metering volume, which volume corresponds to the difference between the volume of the chamber 38 in the high position and the volume of the chamber 38 in the low position. This metering volume determines the amount of composition that is delivered each time the device is activated. In FIG. 1, the metering chamber 38 has substantially zero volume, since the pump is in the activated position with the quantity of composition previously contained in the metering chamber having just been expelled. In FIG. 2, the chamber 38 has a volume substantially equal to the volume of one measured dose of composition. In the example of FIG. 3, the means 82 comprise two lips of toroidal section. In the variant embodiment shown in FIG. 4, the means 82 comprise two lips of angular section.

The rigid portion 84 is a body of revolution, extending mainly inside the cylindrical skirt of the membrane 30. In this example, the rigid portion 84 is substantially in the form of a ring carrying the second means 82 on its outside surface. Furthermore, the rigid portion 84 includes a base 90 for bearing against the support 26, coming into abutment against a shoulder 92 of the support so as to facilitate accurate assembly of the membrane 30. Furthermore, in this example, the ring 84 is provided with a bearing surface 94 for an assembly tool. More precisely, this surface 94 is in the form of a top collar 94 acting as a bearing surface for an assembly tool to make it easy to press the membrane 30 against the support 26. Optionally, the connection between the collar 94 and the remainder of the ring is perforated so as to create a bridge of material between the means 82 and the means 80 of the membrane, providing a mechanical connection for better retention of the elements 80 and 82 on the rigid portion 84. It should be observed that other forms of mechanical and/or chemical connection could equally well be envisaged.

The dispenser head 14 also includes a second cylinder 40 made integrally with the first cylinder 36. Naturally, the cylinders 36 and 40 could be made as a plurality of parts. A plunger 42 is mounted inside the second cylinder 40 to be slidable between a rest position and an activated position under drive from first return means 43 constituted by a spring in compression. The plunger 42 is provided with a base 42*a* that is mounted in leaktight manner in the second cylinder 40, with a rod 42*b* that is configured to be capable, in the rest position of the pump, of closing an orifice 44 formed on the bottom end of the second cylinder 40, and with an end 42*c* projecting a little into the metering chamber 38 when the plunger 42 is in the activated position. This end 42*c* is configured to press against the membrane 30 when the movable portion 14 is in the activated position, so as to guarantee that the orifice 44 opens during a stage of priming the device (i.e. so as to expel air from the metering chamber 38 towards the top of the device), and/or to close the feed orifice of the support 26.

The dispenser head 14 also includes a support 46 mounted stationary relative to the first and second cylinders 36 and 40, and defining a dispenser chamber 48. Naturally, the support 46 could be made integrally with the elements 36 and/or 40. It is generally on the support 46 that the dispenser endpiece of the device is mounted, the chamber 48 being connected to a dispenser nozzle provided on the endpiece. It should be observed that the chamber 48 is not necessarily present on the support 46, it would suffice to provide merely a connection connecting the support 46 and/or the cylinder 40 with the dispenser endpiece. The support 46 of the head 14 is provided with an inner skirt 50 and an outer skirt 52, with second return means 54 being housed therebetween. The second return means 54 are constituted by a spring in compression, bearing firstly on the support 46 between the two skirts 50 and 52, and secondly on the stationary portion 12 at the bottom of the sleeve 22. By means of the spring 54, the head 14, which is movable relative to the stationary portion 12 between a rest position and an activated position, is held in a high position, as shown in FIG. 1. Inside the inner skirt 50, the support 46 also presents a bearing piece for the first spring 43. The support 46 also has means for ensuring that liquid can pass from the metering chamber 38 towards the dispenser endpiece, and more precisely towards the dispenser chamber 48, arranged in particular between the second cylinder 40 and the inner skirt 50, preferably in such a manner as to ensure that liquid passes without the liquid coming into contact with the return means 43 and 54.

The pump 10 also has means 56, 58 for putting the movable portion 14 into abutment relative to the stationary portion 12, which means need to be forced past in order to enable the portion 14 to go from its rest position to its activated position. In this example, the means 56 and 58 comprise three abutments 58 carried by the stationary portion 12, and three abutments 56 carried by the movable portion 14 and deformable between an abutment configuration and a retracted configuration. The abutment means 56, 58 are permanent, and they need to be forced past on each activation of the pump by the user. They serve to constrain the user to exert some minimum level of force on the movable portion 14 in order to ensure that complete doses are delivered, ensuring a spray of good quality, in particular in terms of the size and the density of its particles.

The pump shown in FIGS. 1 to 4 when assembled on a reservoir and provided with a dispenser endpiece operates as described below.

Before the user delivers a dose of composition, the pump 10 is in rest or high position, as shown in FIG. 2. In this position, the pump is already primed, so the metering chamber 38 presents a certain volume, referred to as the high position volume, and it is full of composition, with the composition contained in this chamber 38 comprising the dose of composition that is to be dispensed. In other words, and as can be seen in FIG. 2, the rest position corresponds to a position in which the first cylinder 36, and thus the entire movable portion 14, is offset upwards relative to the stationary portion 12, in particular relative to the pump body 16. In this position, the plunger 42 is pressed against the bottom end of the cylinder 40 under drive from the spring 43, the rod **42*b* co-operating with the orifice 44 so as to close the orifice. Furthermore, in this position, the end 42*c* of the plunger 42 is not in contact with the piston 20, the piston being at the bottom of the metering chamber 38. The means 80** forming a check valve are in the liquid-blocking configuration.

When the user desires to dispense a dose of composition, the user presses on the movable portion 14 of the pump 10, possibly by pressing on the dispenser endpiece. This exerts a force on the movable portion 14 as represented by arrow 70 in FIG. 1, for the purpose of activating the pump 10. Under the action of this thrust, the movable portion 14 begins to move downwards, until the abutment means 56, 58 are forced past.

Once the abutment means 56, 58 have been forced past, the movable portion 14 continues its downward stroke, as represented by arrow 70. Thus, on moving downwards, the support 46 causes the first and second cylinders 36 and 40 also to move downwards, thereby having the effect of reducing the volume of the metering chamber 38, the membrane 30 sliding in the chamber 38. More precisely, the liquid contained in this chamber exerts upward pressure on the plunger 42 so that the rod **42*b* is moved and no longer closes the orifice 44. The liquid can thus escape from the chamber 38. Once the liquid has passed through the orifice 44, it flows between the second cylinder 40 and the inner skirt 50 and then passes into the dispenser chamber 48, in order to be delivered out from the dispenser endpiece. It should be observed that when the volume of the metering chamber 38 decreases so as to reach its low position volume, substantially zero in this example, the liquid exerts pressure on the plunger 42 so as to raise it. In an optional embodiment, the end 42*c* of the plunger in the low position presses against the membrane 30 so as to press it against the top end 32 of the support 26, thereby closing the release orifice(s) 88**.

Once the metering chamber 38 has reached its low position volume, substantially zero in this example, i.e. once the dose of composition has been dispensed, the user releases thrust on the movable portion 14. Under drive from the spring 43, the plunger 42 is once more pressed against the bottom wall of the cylinder 40 so as to close the orifice 44. Furthermore, under drive from the spring 54, the movable portion 14 moves back upwards in the opposite direction to arrow 70, thereby causing the second cylinder 36 to slide relative to the piston 20 in the opposite direction to arrow 70. In this way, the volume of the metering chamber 38 is increased so as to create suction and suck in composition via the dip tube 18. More precisely, the means 80 deform so as to take up their liquid-release configuration. The movable portion 14 moves upwards to the initial rest position. In this position, the metering chamber 38 is once more full of composition, with an identical high position volume, thus enabling another dose to be delivered of volume identical to the dose that has just been delivered. The means 80 return to their liquid-blocking position.

It should be observed that the device described is not limited to the above-described example. In particular, a membrane similar to the membrane 30 may be used in a device other than a pump. Amongst the advantages of the membrane 30, it should be understood that better control is provided over the force required for opening the orifice 88 in the membrane, because of the accurate dimensions and positioning. The use of a two-material membrane to form the check valve that is pressed against a seat 32 having the membrane 30 fitted thereon ensures that the check valve function is performed in particularly reliable manner.

What is claimed is:

1. A device for delivering a composition, the device comprising a piston having a support and a membrane, the support including a feed channel opening out via one or more feed orifices provided in the top end of the support, the membrane being mounted to slide in a metering chamber and comprising:

a first sealing means forming a check valve, the first sealing means being capable of taking a liquid-blocking configuration by being pressed against the support; and a second sealing means enabling the membrane to slide in leaktight manner relative to the metering chamber;

the first and second sealing means being made of a material that is relatively flexible, the membrane also including a rigid portion made of a material that is more rigid than the material of the first and second sealing means, the rigid portion being distinct from the support.

2. The device according to claim 1, wherein the rigid portion and the first and second sealing means are obtained by co-injection, bi-injection, or overmolding.

3. The device according to claim 1, wherein the rigid portion is made of a material selected from a polymer or metal.

4. The device according to claim 1, wherein the rigid portion is substantially in the form of a ring.

5. The device according to claim 1, wherein the second sealing means include at least one lip forming a body of revolution.

6. The device according to claim 1, wherein the membrane includes a transverse wall carrying the first sealing means, and a cylindrical skirt carrying the second sealing means, the rigid portion extending mainly in the cylindrical skirt.

7. The device according to claim 1, wherein the membrane is assembled on the support and includes a base bearing against the support, the bearing base forming a portion of the rigid portion of the membrane.

8. The device according to claim 1, wherein the rigid portion includes a bearing surface for a tool for assembling the membrane in the device.

9. The device according to claim 1, including third sealing means providing permanent sealing between the membrane and the support.

10. The device according to claim 1, wherein the membrane is used in a pump.

11. The device according to claim 1, wherein the membrane is fitted on the support, and the support includes a bearing seat for the first sealing means, which first sealing means are pressed against the seat when they are in a blocking configuration, and are spaced apart therefrom when they are in a composition-release configuration.

12. The device according to claim 11, wherein the seat is integrally molded with the support.

13. The device according to claim 1, wherein the support includes a tubular portion defining the feed channel and the membrane includes a cylindrical skirt mounted stationary around said tubular portion.

14. The device according to claim 3, wherein the material is one of polypropylene, polyethylene, polyester, polyacetal, and polyamide.

15. The device according to claim 3, wherein the material is poly-butylene-terephthalate (PBT).

16. The device according to claim 3, wherein the material is stainless steel.

* * * * *